United States Patent
Chheda et al.

(10) Patent No.: US 6,402,934 B1
(45) Date of Patent: Jun. 11, 2002

(54) RECOVERY AND TRANSPORTATION OF HEAVY CRUDE OILS

(75) Inventors: Bharati Dinkar Chheda; Rajiv Manohar Banavali, both of Houston, TX (US); Guido Mazza, Caracas (VE)

(73) Assignee: Rohm and Haas Company, Philadelphia, PA (US)

( * ) Notice: Subject to any disclaimer, the term of this patent is extended or adjusted under 35 U.S.C. 154(b) by 0 days.

(21) Appl. No.: 09/514,462

(22) Filed: Feb. 28, 2000

Related U.S. Application Data

(60) Provisional application No. 60/122,496, filed on Mar. 2, 1999.

(51) Int. Cl.[7] .............................................. C10C 1/20
(52) U.S. Cl. .......................... 208/44; 208/39; 208/40; 507/239; 507/244
(58) Field of Search ............................ 208/39, 40, 44; 585/2, 3, 4; 507/239, 244

(56) References Cited

U.S. PATENT DOCUMENTS

| | | | |
|---|---|---|---|
| 3,964,548 A | 6/1976 | Schroeder et al. | |
| 4,026,870 A | 5/1977 | Floryan et al. | ......... 260/47 ET |
| 4,192,755 A | 3/1980 | Flournoy et al. | |
| 4,407,367 A | 10/1983 | Kydd | |
| 4,425,246 A | 1/1984 | Holzwarth et al. | |
| 4,687,586 A | 8/1987 | Argabright et al. | |
| 4,876,018 A | 10/1989 | Karydas | |
| 4,938,876 A | 7/1990 | Ohsol | .......................... 210/708 |
| 5,143,156 A | 9/1992 | Bromley | |
| 5,190,656 A | 3/1993 | Paul et al. | ................... 210/643 |
| 5,271,863 A * | 12/1993 | Roling | ........................ 252/184 |
| 6,180,683 B1 * | 1/2001 | Miller et al. | ................... 208/39 |

FOREIGN PATENT DOCUMENTS

| | | |
|---|---|---|
| EP | 0451824 A2 | 10/1991 |
| WO | WO 99/32572 | 7/1999 |

OTHER PUBLICATIONS

H.F. Mark Editor: "Encyclopedia of Polymer Science and Engineering, vol. 3" 1985, John Wiley & Sons, New York XP002141274 * Page 371*.

* cited by examiner

*Primary Examiner*—Philip Tucker
(74) *Attorney, Agent, or Firm*—Kenneth Crimaldi; Thomas J. Howell

(57) ABSTRACT

Novel amine-chelate complexes are useful in significantly reducing the viscosity of heavy crude oils, facilitating the recovery and transportation of such heavy crude oils. The amine-chelate complexes are formed by heating together an organic amine with a chelating agent.

8 Claims, No Drawings

RECOVERY AND TRANSPORTATION OF HEAVY CRUDE OILS

CROSS REFERENCE TO RELATED PATENT APPLICATIONS

This application claims priority to prior co-pending provisional application Ser. No. 60/122,496, filed Mar. 2, 1999.

BACKGROUND OF THE INVENTION

The present invention relates generally to the field of petroleum production and transportation. In particular, the present invention relates to the use of certain amine-chelate complexes to reduce significantly the viscosity of heavy crude oils.

Heavy crude oils ("HCO" or "HCOs") constitute a significant portion of the known global petroleum reserves. Vast deposits of HCOs are located in Colombia, Venezuela, Mexico and Canada. HCOs are highly viscous or solid at ambient temperature, and have a gravity of 20 or less on the API (American Petroleum Institute) density scale. HCOs include the high molecular weight hydrocarbons referred to as "tars," "petroleum tars" or "tar sands," such as the deposit known as the Athabasca Tar Sands in Alberta, Canada. In comparison, "conventional" or "light" crudes such as those found in the Middle East typically have API gravity of 37 or greater.

In addition to being more viscous than conventional crude oils, certain HCOs are rich in asphaltenes, metals and resins. While there is a wide variety in HCO composition and physical properties, many HCOs typically contain high levels of sulfur, nitrogen, nickel and vanadium, and are rich in the condensed polyaromatic compounds which react readily to form coke. The presence of these types of compounds in HCOs can lead to various problems in the recovery, transportation, treatment and refining of crude oils.

In order for the extraction and transportation of HCOs to be economically viable, the flow resistance of the HCO must be reduced sufficiently to enable the use of reasonably sized wellbores, pipelines and pumping equipment. Some common methods of reducing flow resistance include: heat, dilution, partial field upgrading, water-emulsification, and lubrication and core-annular flow. Heat is generally applied using steam generated at or near the well site.

The primary method for recovering HCOs from oil-bearing formations is steam injection, also know as steam flooding. Although there are numerous variations, there are two basic techniques: the "huff and puff" (or "push-pull") involves injecting steam into a formation, alternating with back-producing the oil through the same well; and the "steam drive" involves injecting steam into a formation through one well (an "injection" well) and producing the oil from a different well (a "production" or "recovery" well). Variations include the number and type of wells, as well as their location and configuration.

The steam injection method is useful in recovery of HCOs because relatively small increases in the temperature of HCOs result in relatively large reductions in viscosity. This also explains some of the limitations and problems of this method. For example, it is expensive but necessary to locate steam generators near the injection wells. In addition, heating of the oil-bearing formation also results in heating of the adjacent rock. Third, there is a lower limit to the well depth to which the steam injection can be effectively applied, since the steam cools and liquefies as it proceeds down the well-bore. This well depth limit will depend on the particular conditions at the well site, but will generally be about 2,000 feet (600 meters). Many wells are much deeper, and are measured in terms of miles. Moreover, as the steam cools and becomes water, the crude returns to its original highly viscous state, complicated by the material being a water-oil emulsion from which the desired petroleum products are hard to separate and refine.

Alternate heat recovery methods have been developed to overcome some of the deficiencies of the steam injection methods. These include: the use of gas-fired radiant tube heaters located at the well bottom to heat the oil-bearing formation; the use of heated organic vapor in place of steam to heat the formation; and in situ exothermic reactions (i.e., alkali metals and water).

An alternative technique is to reduce viscosity by diluting the crude with less viscous hydrocarbons such as condensates, naphtha, or other solvents. Pipeline transportation usually requires blending the crude with lighter hydrocarbon diluents to obtain a kinematic viscosity of 1000 cps or less; however, supplies of diluent are insufficient to meet projected requirements.

Other chemical means for reducing HCO viscosity in oil-bearing formations include the use of solvents and surfactant systems, certain high molecular weight polymers and polysaccharide solutions. See for example, U.S. Pat. No. 4,687,586 (Argabright et al.), U.S. Pat. No. 4,425,246 (Holzwarth et al.), U.S. Pat. No. 4,192,755 (Flournoy et al.) and U.S. Pat. No. 3,964,548 (Schroeder Jr, et al.). The main problem with these chemical methods is the large volume of solvent needed (generally about 10–20% by volume of HCO).

In similar vein, U.S. Pat. No. 4,876,014 (Karydas) discloses the use of certain fluorochemical compounds having oleophobic and hydrophobic groups to reduce the viscosity of asphaltenic crude oils, optionally in combination with a low viscosity diluent.

In spite of these and numerous other methods, high viscosity and the resultant lack of flow remains problematic in the recovery of HCOs. Moreover, many of these methods are ineffective in extracting petroleum from tar sands. Last, even if the HCO can be extracted from the formation, transportation of the HCO from the well site to the refinery or to storage is often difficult and expensive. The most prevalent form of transportation from the well site is by pipeline. With HCOs, the pipelines must be heated in order to maintain the flow of oil.

Thus, there remains a need for other HCO recovery methods, especially where the means of extraction can also be used to facilitate transportation of the material from the well site.

STATEMENT OF THE INVENTION

The present invention is directed to novel amine-chelate complexes formed by heating together at least one organic amine; and at least one chelating agent. The present invention also includes compositions for reducing the viscosity of heavy crude oils, comprising 0.01–50 wt % of at least one such amine-chelate complex and an organic solvent.

The present invention is also directed to a method for recovering heavy crude oil from an oil-bearing formation having at least one well penetrating said formation and in fluid communication therewith, comprising the steps of: (a) injecting into the well and the formation a viscosity-reducing amount of an amine-chelate complex as described above; (b) allowing the amine-chelate complex to disperse into the formation; and (c) recovering the reduced viscosity oil.

In yet another aspect, the present invention is also directed to a method for reducing viscosity of heavy crude oils in significantly non-reversible manner, comprising the steps of: adding a viscosity-reducing amount of an amine-chelate complex of the present invention to a heavy crude oil, and dispersing the amine-chelate complex throughout a portion of the heavy crude oil.

DETAILED DESCRIPTION OF THE INVENTION

As used in this specification, the terms "crude" and "crude oil" are used interchangeably, and refer to unrefined petroleum. The following abbreviations are used throughout this specification: mL=milliliter; m=meter; km=kilometer; g=grams; wt %=percent by weight; ppm=parts per million; rpm=revolutions per minute; cps=centipoise; HOAc=acetic acid; EDTA=ethylenediamine tetraacetic acid; NTA= nitrilotriacetic acid. Unless otherwise indicated, all ranges (including ranges of ratios) are inclusive.

The complexes of the present invention are generally formed by heating certain organic amines with certain chelating agents. The amounts of amine and chelating agent used to form the complexes can vary greatly, depending on several factors such as the particular application, the HCO composition, and the physical properties of the HCO and the formation from which it is to be extracted; however, in general the molar equivalent ratio of amine to chelating agent acid equivalent will be in the range of 10:1 to 1:2. It is preferred that the ratio is 6:1 to 1:1. Most preferred is a ratio of 5:1 to 4.5:1.

Combinations of different complexes of the present invention can also be used. Combinations can be prepared either by mixing different amines, chelating agents, or both, to form mixtures of the complexes, or by mixing different complexes prepared separately.

For HCO recovery, the complexes of the present invention can be injected directly into an injection well, or are preferably diluted with solvent prior to injection. Suitable solvents include but are not limited to: petroleum distillates such as kerosene and gas oil; linear and branched aliphatic solvents such as pentane, hexane, mixtures of nonanes and 2-ethylhexanes; cycloaliphatic mixtures commonly known as naphtha; aromatic solvents such as toluene, xylenes and commercial solvent mixtures such as aromatic solvents 100, 150 and 200; esters; ethers; alcohols such as ethanol, isopropanol, octanol and dodecanol; ketones such as acetone, cyclohexanone and acetophenone; and other polar solvents. Typical dilutions are 0.01 to 50 wt % of the complex, with preferred dilutions being 0.01 to 10 wt %. The complexes of the present invention can also be used in conjunction with other recovery methods, such as steam injection or organic vapor injection (e.g., U.S. Pat. No. 4,407,367 (Kydd) or U.S. Pat. No. 5,143,156 (Bromley)).

The amount of complex used to lower viscosity for HCO recovery or transportation will vary greatly depending on the amount of viscosity reduction desired, and whether or not additional recovery means will be used. HCO viscosity varies dramatically with increasing amounts of the complexes of the present invention.

Depending on the method of recovery, it may also be useful to add the complexes of the present invention once the oil has been brought to the surface, in order to facilitate transportation of the oil from the well site. If additional complexes are desired, such complexes can be added in the recovery well, or at any time thereafter.

The amines useful to make the complexes of the present invention are organic amines, preferably primary amines. As used in this specification, the term "amine" is used to describe both monoamines and polyamines. It is preferred to use oil-soluble amines to prepare the complexes of the present invention.

Generally speaking, the preferred amines are aliphatic primary monoamines, having the general formula (I):

$$R—NH_2 \qquad (I)$$

Especially preferred are: saturated or olefinically unsaturated aliphatic primary amines such as n-octylamine, 2-ethylhexylamine, t-octylamine, n-decylamine, $C_4$–$C_{40}$ tertiary alkyl primary amines (either singly or in any combinations thereof), tridecylamine, n-undecylamine, lauryl amine, hexadecylamine, heptadecylamine, octadecylamine, decenylamine, dodecenylamine, palmitoleylamine, oleylamine, linoleylamine, eicosenylamine and polyetheramine; and polyalkylamines such as polyisobutyleneamine. Commercially available mixtures of suitable primary aliphatic amines in the $C_{12}$–$C_{18}$ range include ARMEEN O and ARMEEN OD (Akzo Nobel; Stratford, Conn.).

It is preferred to use oil-soluble aliphatic amines in which the aliphatic group is a tertiary aliphatic group, most preferably a tertiary alkyl group. Commercially available mixtures of suitable amines of this type include PRIMENE TOA, PRIMENE BC-9, PRIMENE 81-R and PRIMENE JM-T amines (Rohm and Haas Company; Philadelphia, Pa.).

Also desirable are the saturated or substantially saturated aliphatic ($C_8$–$C_{40}$) secondary amines, such as diethanolamine, morpholine, di-isoamylamine, di-n-octylamine, di-(2-ethylhexyl)amine, di(cyclohexyl)amine, di-(t-octyl)amine, di-n-nonylamine, dilauryl amine, di-hexadecylamine, di-octadecylamine, and di-oleylamine. One such commercially available secondary amine is the long chain alkylamine known as AMBERLITE LA-2 (Rohm and Haas Company).

Also desirable are tertiary monoamines exemplified by cyclohexyl dimethyl amine, triethanolamine, pyridine and trioctyl amine.

A few representative examples of polyamine reactants which may be employed in this invention include straight or branched-chain alkanes containing two or more amino groups, at least one of which is a primary amino group. Such compounds include but are not limited to: polyaminoalkanes such as 1,6-diaminooctane, 1,8-diaminooctane, 1,5,9-triaminononane and tetraamino-neopentane; polyaminoalkanols such as 2-(2-aminoethylamino)ethanol and 2-[2-(2-aminoethylamino)ethylamino]ethanol; heterocyclic compounds containing two or more amino groups at least one of which is a primary amino group, such as 1-(β-aminoethyl)-2-imidazolidone, 2-(2-aminoethylamino)-5-nitropyridine, 3-amino-N-ethylpiperidine, 2-(2-aminoethyl)-pyridine, 5-aminoindole, 3-amino-5-mercapto-1,2,4-triazole, 4-(aminomethyl)piperidine, 3-aminopiperidine and 2-aminopyridine; alkylene polyamines such as 1,2-propylene diamine, di-(1,2-propylene)triamine, di-(1,3-propylene)triamine, N,N-dimethyl-1,3-propanediamine, 1,4-butanediamine, di-(1,2-butylene)triamine, N-(2-aminoethyl)-1,3-propanediamine, hexamethylenediamine and tetra-(1,2-propylene)pentamine; hydroxyamines such as tris(hydroxymethyl)aminomethane, isopropanol amine, N-(2-hydroxyethyl)-1,3-propanediamine, N-2-hydroxypropylethylene diamine, N-aminoethylethanolamine and 4-aminophenol; aromatic polyamines such as p-phenylene diamine and the like; N,N'-disalicylidene-1,2-alkane diamines such as N,N'disalicylidene-1,2-ethane diamine, N,N'disalicylidene-1,2-butane diamine, N,N'disalicylidene-1,2-cyclohexane diamine and (most preferably) N,N'-disalicylidene-1,2-propane diamine. Also preferred are PRIMENE MD (Rohm and Haas Company) and isophorone diamine.

Other useful polyamines include polyoxyalkylene polyamines such as the polyoxyalkylene diamines and polyoxyalkylene triamines, which may have various number average molecular weights, typically in the range of about 200 to about 4,000. Polyoxyalkylene polyamines are commercially available, and may be obtained for example, from Huntsman Chemical Company, Inc. (Conroe, Tex.), under the JEFFAMINE trademarks (e.g., JEFFAMINE D-230, JEFFAMINE D400, JEFFAMINE D-1000, JEFFAMINE D2000, JEFFAMINE T-403).

Another group of polyoxyalkylene polyamines are those represented by formula (II):

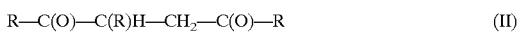

wherein R=—NH—(alkylene-O)$_n$alkylene-NH$_2$ and n=2 or 3. The alkylene groups can be the same or different and are straight or branched chain groups containing 2 to 8 carbon atoms each, preferably 2 to 4 carbon atoms each. These compounds are formed by reacting 3 to about 3.5 moles of a dicarboxylic acid reactant such as maleic acid, fumaric acid, their anhydrides or C$_{1-4}$ dialkyl esters with a polyoxyalkylene diamine of the formula H$_2$N-(alkylene-O)$_n$alkylene-NH$_2$, wherein the alkylene and n are as defined above.

The alkylene polyamine reactants which are useful with this invention include polyamines which are linear, branched, cyclic or mixtures thereof, wherein each alkylene group contains 1 to 10 carbon atoms. In this class of amines are the ethylene polyamines which can be depicted by formula (III):

wherein n is an integer from one to about ten.

Preferred ethylene polyamines are polyamines containing 2 to 10 nitrogen atoms per molecule or a mixture of polyamines containing an average of 2 to 10 nitrogen atoms per molecule. These compounds include but are not limited to: ethylenediamine, diethylene triamine, triethylene tetramine, tetraethylene pentamine, pentaethylene hexamine, hexaethylene heptamine, heptaethylene octamine, octaethylene nonamine, nonaethylene decamine and mixtures thereof.

Corresponding propylene polyamines such as propylene diamine, dipropylene triamine, tripropylene tetramine, tetrapropylene pentamine and pentapropylene hexamine are also suitable amine reactants. Particularly preferred polyamines are polyamine or mixture of polyamines having an average of 3 to 7 nitrogen atoms in combination with diethylene triamine, or mixtures of ethylene polyamines whose physical and chemical properties approximate that of diethylene triamine. In selecting an appropriate polyamine, consideration should be given to its solubility in HCOs.

Commercially available ethylene polyamine mixtures usually contain minor amounts of branched species and cyclic species such as N-amino-ethyl piperazine, N,N'-bis(aminoethyl)piperazine, N,N'-bis(piperazinyl)ethane and like compounds. The preferred commercial mixtures have a approximate overall compositions falling in the range corresponding to diethylene triamine to pentaethylene hexamine, mixtures generally corresponding in overall makeup to tetraethylene pentamine being most preferred. Various suitable low cost polyethylene polyamine mixtures are available under various trade designations such as POLYAMINE H, POLYAMINE 400, DOW POLYAMINEE-100, and DOW S-1107 (Dow Chemicals,; Midland, Mich.).

A most preferred class of amines useful in the present invention are tertiary alkyl primary amines of formula (IV):

wherein R$^1$, R$^2$, and R$^3$ are each independently selected from: (C$_1$–C$_{37}$) alkyl; substituted (C$_1$–C$_{37}$) alkyl; (C$_1$–C$_{37}$) alkenyl; and substituted (C$_1$–C$_{37}$) alkenyl. As used in this specification, the term "(C$_1$–C$_{37}$)" means a straight chain or branched alkyl or alkenyl group having 1 to 37 carbon atoms per group.

Suitable examples of (C$_1$–C$_{37}$) alkyl include, but are not limited to: methyl, ethyl, n-propyl, isopropyl, n-butyl, isobutyl, t-butyl, n-pentyl, isopentyl, neopentyl, n-hexyl, 2-ethylhexyl, octyl, decyl, isodecyl, undecyl, dodecyl (also known as lauryl), tridecyl, tetradecyl (also known as myristyl), pentadecyl, hexadecyl, heptadecyl, octadecyl, nonadecyl, cosyl and eicosyl.

Suitable examples of (C$_1$–C$_{37}$) alkenyl include, but are not limited to: ethenyl, n-propenyl, isopropenyl, 1-butenyl, cis-2-butenyl, isobutylene, trans-2-butenyl, 2,3,-dimethyl-2-butenyl, 3-methyl-1-butenyl, 2-methyl-2-butene, 1-pentenyl, cis-2-pentenyl, trans-2-pentenyl, 1-hexenyl, 1-heptenyl, 1-octenyl, 1-nonenyl and 1-decenyl.

Suitable examples of (C$_1$–C$_{37}$) substituted alkyl and alkenyl include, but are not limited to the above recited alkyl and alkenyl groups substituted with: hydroxy; halide such as fluorine, chlorine or bromine; cyano; alkoxy; haloalkyl; carbalkoxy; carboxy; amino; alkylamino derivatives and the like; and nitro groups.

These tertiary alkyl primary amines may be used as a single amine or a mixture of amines, and include but are not limited to: 1,1,3,3-tetramethylbutylamine (PRIMENE TOA); an isomeric mixture of C$_{16}$ to C$_{22}$ tertiary alkyl primary amines (PRIMENE JM-T); an isomeric mixture of C$_8$ to C$_{10}$ tertiary alkyl primary amines (PRIMENE BC-9); an isomeric mixture of C$_{12}$ to C$_{14}$ tertiary alkyl primary amines (PRIMENE 81-R); or mixtures thereof. It is preferred to use PRIMENE BC-9, PRIMENE 81-R, or mixtures thereof. Most preferred is PRIMENE BC-9.

A chelating agent, or chelant, is a compound which contains two or more electron donor atoms that can form coordinate bonds to a single metal atom. A chelate compound may be either a neutral molecule or complex ion associated with the appropriate counterion. Chelating agents may be either organic or inorganic, aromatic or aliphatic, linear or cyclic, branched or linear aliphatic. A broader discussion of chelating agents can be found in an article by W. L. Howard and D. A. Wilson in Kroschwitz, J. I. (Ed.), *Kirk-Othmer Encyclopedia Of Chemical Technology*, Volume 5,4$^{th}$ Edition, J. Wiley: NY (1993), pp. 764–795. For purposes of this invention, those chelants that can form oil soluble complexes with said amines are preferred.

Some of the preferred classes of chelating agents useful in the present invention include: organic acids such as acetic acid, acrylic acid and lauric acid; aminocarboxylic acids such as ethylenediaminetetraacetic acid, hydroxyethylethylenediaminetriacetic acid, nitrilotriacetic acid, N-dihydroxyethylglycine and ethylenebishydroxyphenyglycine; phosphonic acids such as nitrilotrimethylenephosphonic acid, ethylenediaminetetra(methylenephosphonic acid) and hydroxyethylidenediphosphonic acid; polyphosphates such as sodium tripolyphosphate and hexametaphosphoric acid; 1,3-diketones such as acetylacetone, trifluoroacetylacetone and thenoyltrifluoroacetone; phenols such as salicylaldehyde, disulfopyrocatechol and chromotropic acid; aminophenols such as oxine, 8-hydroxyquinoline and oxinesulfonic acid; oximes such as dimethylglyoxime and salicylaldoxime; sulfur compounds such as thioglycolic acid and diethyl dithiophosphoric acid; macrocylic compounds such as dibenzo-[18]-crown-6, hexamethyl-[14]-4,11-dieneN$_4$ and (2.2.2-cryptate); polycarboxylic acids such as citric acid and poly(p-vinylbenzyliminodiacetic acid); terminally unsaturated acrylic acid oligomers such as described in U.S. Pat. No. 5,710,227 (Freemand et al.); other polymeric compounds such as polymethacryloylacetone; and salts of such compounds, as appropriate. It is most preferred to use HOAc, EDTA, NTA and their salts. Most preferred are EDTA and its salts.

The following examples are presented to illustrate further various aspects of the present invention, but are not intended to limit the scope of the invention in any respect.

Examples 1–11 illustrate the preparation of various complexes of the present invention.

EXAMPLE 1

To a 3-necked round bottom flask equipped with a mechanical stirrer, heating mantle, addition funnel and reflux condenser was added 0.5 moles of an isomeric mixture of $C_{12}$ to $C_{14}$ tertiary alkyl primary amines. The mixture was heated to about 60° C., at which time 0.2 moles of EDTA was slowly added to the amine mixture through the additional funnel, with stirring, to maintain the temperature between 80 and 100° C. When addition was completed, the reaction temperature was raised to 120–140° C. and maintained for about an hour (or until the EDTA was completely dissolved). The pH of the mixture was checked, and if below 8.5, additional amine was added. The reaction mixture was then allowed to cool to room temperature.

EXAMPLE 2

To a 3-necked round bottom flask equipped with a mechanical stirrer, heating mantle, addition funnel and reflux condenser was added 0.26 moles of an isomeric mixture of $C_{12}$ to $C_{14}$ tertiary alkyl primary amines and 113 g of toluene. The mixture was heated to about 60° C., at which time 0.057 moles of EDTA was slowly added to the amine and toluene mixture through the additional funnel, with stirring, to maintain the temperature between 80 and 100° C. When addition was completed, the reaction temperature was maintained at 100° C. for about four hours (or until the EDTA was completely dissolved). The pH of the mixture was checked, and if below 8.5, additional amine was added. The reaction mixture was then allowed to cool to room temperature.

EXAMPLE 3

To a 3-necked round bottom flask equipped with a mechanical stirrer, heating mantle, addition funnel and reflux condenser was added 0.9 moles of an isomeric mixture of $C_8$ to $C_{10}$ tertiary alkyl primary amines. The mixture was heated to about 60° C., at which time 0.05 moles of EDTA was slowly added to the amine and toluene mixture through the additional funnel, with stirring, to maintain the temperature between 80 and 100° C. When addition was completed, the reaction temperature was maintained at 100° C. for about four hours. The pH of the mixture was checked, and if below 8.5, additional amine was added. The reaction mixture was then allowed to cool to room temperature.

EXAMPLE 4

To a 3-necked round bottom flask equipped with a mechanical stirrer, heating mantle, addition funnel and reflux condenser was added 0.26 moles of an isomeric mixture of $C_8$ to $C_{10}$ tertiary alkyl primary amines and 103 g of kerosene. The mixture was heated to about 60° C., at which time 0.02 moles of NTA was slowly added to the amine and toluene mixture through the additional funnel, with stirring, to maintain the temperature between 80 and 100° C. When addition was completed, the reaction temperature was maintained at 100° C. for about four hours. The pH of the mixture was checked, and if below 8.5, additional amine was added. The reaction mixture was then allowed to cool to room temperature.

EXAMPLE 5

To a 3-necked round bottom flask equipped with a mechanical stirrer, heating mantle, addition funnel and reflux condenser was added 0.3 moles of an isomeric mixture of $C_{10}$ to $C_{14}$ tertiary alkyl primary amines and 103 g of kerosene. The mixture was heated to about 60° C., at which time 0.02 moles of NTA was slowly added to the amine and toluene mixture through the additional funnel, with stirring, to maintain the temperature between 80 and 100° C. When addition was completed, the reaction temperature was maintained at 100° C. for about four hours. The pH of the mixture was checked, and if below 8.5, additional amine was added. The reaction mixture was then allowed to cool to room temperature.

EXAMPLE 6

To a 3-necked round bottom flask equipped with a mechanical stirrer, heating mantle, addition funnel and reflux condenser was added 85.9 g of Example 3 and 38.8 g of $C_8$ to $C_{10}$ tertiary alkyl primary amines. The mixture was heated to about 100° C. for an hour or until the mixture was clear. The reaction mixture was then allowed to cool to room temperature.

EXAMPLE 7

To a 3-necked round bottom flask equipped with a mechanical stirrer, heating mantle, addition funnel and reflux condenser was added 40 g of the mixture from Example 6 and 40 g of toluene. The mixture was mixed until homogeneous and clear.

EXAMPLE 8

To the material from Example 4, 59 g of isopropanol was added and mixed until the material was clear.

EXAMPLE 9

To a 3-necked round bottom flask equipped with a mechanical stirrer, heating mantle, addition funnel and reflux condenser was added 0.34 moles of an isomeric mixture of $C_{16}$ to $C_{22}$ tertiary alkyl primary amines. The mixture was heated to about 60° C., at which time 0.12 moles of acetic acid was slowly added to the amine mixture through the additional funnel, with stirring, to maintain the temperature between 80 and 100° C. When addition was completed, the reaction temperature was raised to 120–140° C. and maintained for about an hour (or until the mixture was completely clear). The pH of the mixture was checked, and if below 8.5, additional amine was added. The reaction mixture was then allowed to cool to room temperature.

EXAMPLE 10

To a 3-necked round bottom flask equipped with a mechanical stirrer, heating mantle, addition funnel and reflux condenser was added 0.33 moles of an isomeric mixture of $C_{16}$ to $C_{22}$ tertiary alkyl primary amines. The mixture was heated to about 60° C., at which time 0.05 moles of citric acid was slowly added to the amine mixture through the additional funnel, with stirring, to maintain the temperature between 80 and 100° C. When addition was completed, the reaction temperature was raised to 120–140° C. and maintained for about an hour (or until the citric acid was completely dissolved). The pH of the mixture was checked, and if below 8.5, additional amine was added. The reaction mixture was then allowed to cool to room temperature.

EXAMPLE 11

To a 3-necked round bottom flask equipped with a mechanical stirrer, heating mantle, addition funnel and reflux condenser is added 0.9 moles of AMBERLITE LA-2. The mixture was heated to about 60° C., at which time 0.1 moles of nitrilotrimethylene-phosphoric acid is slowly added to the amine mixture through the additional funnel, with stirring, to maintain the temperature between 80 and 100° C. When addition is completed, the reaction temperature is raised to 120–140° C. and maintained for about an hour (or until the mixture is clear). The pH of the mixture is checked, and if below 8.5, additional AMBERLITE LA-2 is added. The reaction mixture is then allowed to cool to room temperature.

In the following Examples 12–16, the viscosity measurements were made using a Brookfield viscometer Model DV-III equipped with a THERMOSEL system (Brookfield Engineering Laboratories, Inc., Stoughton, Mass.) and a temperature controller with an RTD (remote temperature detector) probe. The THERMOSEL system consist of a heating chamber, a removable sample chamber, an SC4 spindle and an insulating cap. As the THERMOSEL system requires only 8 mL of sample, the sample temperature is readily controlled and the viscosity is more accurately measurable.

EXAMPLE 12

This Example illustrates the effect of complex concentration on the viscosity of Venezuelan Heavy Crude Oil. In this Example, the additive was the complex of Example 1.

| Sample ID | Additive (ppm) | Temp = 75° F. (24° C.) | | Temp. = 150° F. (66° C.) | |
|---|---|---|---|---|---|
| | | Viscosity (cps) | % Reduction | Viscosity (cps) | % Reduction |
| 1-A | 0 | 4000 | — | 312 | — |
| | 750 | 3000 | 25.0 | 250 | 19.9 |
| | 1000 | 2950 | 26.2 | 242 | 22.4 |
| | 1250 | 2850 | 28.8 | 235 | 24.7 |
| | 1750 | 2650 | 33.8 | 212 | 32.0 |
| | 2000 | 2350 | 41.2 | 207 | 33.6 |
| 1-B | 0 | 56000 | — | 2050 | — |
| | 750 | 38000 | 32.1 | 1700 | 17.1 |
| | 1000 | 32000 | 42.8 | 1600 | 22.0 |
| | 1250 | 27500 | 50.1 | 1500 | 26.8 |
| | 1750 | 24500 | 56.2 | 1350 | 34.1 |
| | 2000 | 23500 | 58.0 | 1250 | 39.0 |
| 1-C | 0 | — | — | 7900 | — |
| | 750 | — | — | 6200 | 21.5 |
| | 1000 | — | — | 6150 | 22.2 |
| | 1250 | — | — | 6000 | 24.0 |
| | 1750 | — | — | 4600 | 41.8 |
| | 2000 | — | — | 3800 | 51.9 |
| 1-D | 0 | 85000 | — | 3800 | — |
| | 750 | 83000 | 2.4 | 2900 | 23.7 |
| | 1000 | 70500 | 17.0 | 2500 | 34.2 |
| | 1250 | 58000 | 31.8 | 2400 | 36.8 |
| | 1750 | 51000 | 40.0 | 2300 | 39.5 |
| | 2000 | 42500 | 50.0 | 1750 | 53.9 |

EXAMPLE 13

This Example further illustrates the effect of complex concentration on the viscosity of Venezuelan Heavy Crude Oil. In this Example, the additive was the complex of Example 1.

| Sample ID | Additive (ppm) | Temp = 110° F. (43° C.) | | Temp. = 120° F. (49° C.) | |
|---|---|---|---|---|---|
| | | Viscosity (cps) | % Reduction | Viscosity (cps) | % Reduction |
| 1-E | 0 | 47500 | — | 27000 | — |
| | 500 | 38000 | 20.0 | 20000 | 25.9 |
| | 1000 | 30000 | 36.8 | 16500 | 38.9 |
| | 1500 | 22000 | 53.7 | 11500 | 57.4 |
| | 2000 | 17500 | 63.2 | 8000 | 70.4 |
| 1-F | 0 | 10600 | — | 6500 | — |
| | 500 | 9000 | 15.1 | 5800 | 10.8 |
| | 1000 | 7500 | 29.2 | 5100 | 21.5 |
| | 1500 | 6900 | 35.0 | 4800 | 26.2 |
| | 2000 | 5900 | 44.3 | 4200 | 35.4 |
| 1-G | 0 | 975 | — | 755 | — |
| | 500 | 950 | 2.6 | 675 | 10.6 |
| | 1000 | 725 | 25.6 | 550 | 27.2 |
| | 1500 | 625 | 35.9 | 460 | 39.1 |
| | 2000 | 600 | 38.5 | 425 | 43.7 |
| 1-H | 0 | 3400 | — | 2750 | — |
| | 500 | 3000 | 11.8 | 2350 | 14.5 |
| | 1000 | 2550 | 25.0 | 1950 | 29.1 |
| | 1500 | 2200 | 35.3 | 1600 | 41.8 |
| | 2000 | 1950 | 42.6 | 1400 | 49.1 |

EXAMPLE 14

This Example illustrates the effect of complex concentration on the viscosity of pipeline HCO at various temperatures. In this Example, the additive was the complex of Example 1.

| Temp. (° F./° C.) | Additive (ppm) | Viscosity (cps) | % Reduction |
|---|---|---|---|
| 75/24 | 0 | 6580 | — |
|  | 750 | 5650 | 17.5 |
|  | 1000 | 5450 | 20.4 |
|  | 1250 | 5200 | 24.1 |
|  | 1750 | 4500 | 34.3 |
| 90/32 | 0 | 2865 | — |
|  | 750 | 2312 | 19.3 |
|  | 1000 | 2125 | 25.8 |
|  | 1250 | 1875 | 34.6 |
|  | 1750 | 1462 | 49.0 |
| 145/63 | 0 | 492 | — |
|  | 750 | 440 | 10.6 |
|  | 1000 | 420 | 14.6 |
|  | 1250 | 390 | 20.7 |
|  | 1750 | 340 | 30.9 |

EXAMPLE 15

This Example further illustrates the effect of complex concentration on the viscosity of flow station HCO at various temperatures. In the Table below, the Sample ID numbers correspond to Example numbers. For example, 9 means that the additive was the complex of Example 9.

| Sample ID | Additive (ppm) | Temp = 75° F. (24° C.) | | Temp. = 150° F. (66° C.) | |
|---|---|---|---|---|---|
|  |  | Viscosity (cps) | % Reduction | Viscosity (cps) | % Reduction |
| Control | 0 | 12800 | — | 825 | — |
| 9 | 750 | 10000 | 21.9 | 680 | 17.6 |
|  | 1000 | 10600 | 17.2 | 665 | 19.4 |
|  | 1250 | 9000 | 29.7 | 640 | 22.4 |
|  | 1500 | 8800 | 31.2 | 630 | 23.6 |
| 1 | 750 | 8300 | 35.2 | 710 | 13.9 |
|  | 1000 | 8400 | 34.4 | 670 | 18.8 |
|  | 1250 | 9600 | 25.0 | 550 | 33.3 |
|  | 1500 | 6400 | 50.0 | 560 | 32.1 |
| 17 | 750 | 10800 | 15.6 | 800 | 3.0 |
|  | 1000 | 10600 | 17.2 | 650 | 21.2 |
|  | 1250 | 9000 | 29.7 | 655 | 20.6 |
|  | 1500 | 10000 | 21.9 | 540 | 34.5 |

EXAMPLE 16

This example further demonstrates that the viscosity reduction obtained by addition of the complexes of the present invention to samples of Venezuelan HCO is not affected by different diluents.

Additive A-3 was made by diluting the complex of Example 3 with toluene, and Additive B-4 was made by diluting the complex of Example 4 with kerosene. Both complexes were diluted to 10% active.

| Additive | Temperature (° C.) | Viscosity (cps) | % Reduction |
|---|---|---|---|
| None | 21 | 118655 | — |
|  | 40 | 31253 | — |
| 2000 ppm (A-3) | 21 | 82182 | 30.7 |
|  | 40 | 8432 | 73.0 |
| 2000 ppm (B-4) | 21 | 73304 | 38.2 |
|  | 40 | 7507 | 76.0 |

What is claimed is:

1. A method for reducing viscosity of heavy crude oils in significantly non-reversible manner, comprising the steps of: adding a viscosity-reducing amount of an amine-chelate complex formed by heating together at least one organic amine and at least one chelating agent to a heavy crude oil, and dispersing the amine-chelate complex throughout a portion of the heavy crude oil.

2. The method of claim 1, wherein the chelating agent is selected from the group consisting of: carboxylic acids, aminocarboxylic acids; phosphonic acids; polyphosphates; 1,3diketones; phenols; aminophenols; oximes; sulfur compounds; macrocylic compounds; polycarboxylic acids; terminally unsaturated acrylic acid oligomers; and salts thereof.

3. The method of claim 1, wherein the chelating agent is selected from the group consisting of: acetic acid, ethylene diaminetetraacetic acid, nitrilotriacetic acid and salts thereof.

4. The method of claim 1, wherein the organic amine is selected from the group consisting of: aliphatic ($C_1$–$C_{40}$) primary monoamines; polyalkylamines; tertiary monoamines; saturated or substantially saturated aliphatic ($C_1$–$C_{40}$) secondary amines; and polyamines selected from straight or branched-chain alkanes containing two or more amino groups, at least one of which is a primary amino group.

5. The method of claim 4, wherein the organic amine comprises an amine selected from the group consisting of: 2-ethylhexylamine, $C_4$–$C_{40}$ tertiary alkyl primary amines, tridecylamine, polyisobutylamine, oleylamine, di(cyclohexyl)amine, $C_4$–$C_{40}$ long chain alkyl amines and trioctylamine.

6. The method of claim 5, wherein the amine comprises a tertiary alkyl primary amine of formula:

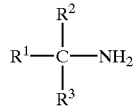

wherein $R^1$, $R^2$, and $R^3$ are each independently selected from: ($C_1$–$C_{37}$) alkyl; substituted ($C_1$–$C_{37}$) alkyl; ($C_1$–$C_{37}$) alkenyl or substituted ($C_1$–$C_{37}$) alkenyl.

7. The method of claim 6, wherein 0.01 to 50 weight percent of the amine-chelate complex is mixed with an organic solvent.

8. The method of claim 7, wherein the weight percent of the amine-chelate complex is 0.01 to 10.

* * * * *